(12) United States Patent
Tanase et al.

(10) Patent No.: US 10,293,817 B2
(45) Date of Patent: May 21, 2019

(54) CONTROL UNIT FOR A VEHICLE

(71) Applicant: Toyota Jidosha Kabushiki Kaisha, Toyota-shi (JP)

(72) Inventors: Masayasu Tanase, Toyota (JP); Wataru Ike, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/212,006

(22) Filed: Jul. 15, 2016

(65) Prior Publication Data

US 2017/0015314 A1    Jan. 19, 2017

(30) Foreign Application Priority Data

Jul. 16, 2015   (JP) .................... 2015-142183

(51) Int. Cl.
*B60W 30/09* (2012.01)
*B60T 1/10* (2006.01)
*B60T 7/12* (2006.01)
*B60W 30/18* (2012.01)

(52) U.S. Cl.
CPC .............. *B60W 30/09* (2013.01); *B60T 1/10* (2013.01); *B60T 7/12* (2013.01); *B60W 30/18109* (2013.01); *B60W 30/18127* (2013.01); *B60T 2270/604* (2013.01); *B60W 2550/10* (2013.01); *B60W 2710/18* (2013.01); *Y10S 903/902* (2013.01)

(58) Field of Classification Search
CPC ........... B60W 30/09; B60W 30/18109; B60W 30/18127; B60W 2250/10; B60W 2710/18; B60T 1/10; B60T 7/12; B60T 2270/604; Y10S 903/902

See application file for complete search history.

(56) References Cited

U.S. PATENT DOCUMENTS

| | | | | |
|---|---|---|---|---|
| 9,499,141 | B1* | 11/2016 | Elkenkamp | ............... B60T 7/22 |
| 9,919,603 | B2* | 3/2018 | Yamakado | ............... B60L 7/18 |
| 2007/0228822 | A1* | 10/2007 | Hirata | ............... B60K 6/48 |
| | | | | 303/151 |
| 2009/0018740 | A1* | 1/2009 | Noda | ............... B60T 7/22 |
| | | | | 701/70 |
| 2009/0102277 | A1 | 4/2009 | Ezoe et al. | |

(Continued)

FOREIGN PATENT DOCUMENTS

| | | |
|---|---|---|
| JP | 2007-84052 | 4/2007 |
| JP | 2007-295784 A | 11/2007 |

(Continued)

*Primary Examiner* — Thomas E Worden
(74) *Attorney, Agent, or Firm* — Oblon, McClelland, Maier & Neustadt, L.L.P.

(57) ABSTRACT

A hybrid ECU reads mode information during regenerative braking, and gradually decreases regenerative braking force when a friction braking force control in accordance with a preparatory mode is started. Thereby, sudden change of deceleration of a vehicle can be prevented. The hybrid ECU 50 makes regenerative braking force disappear immediately when a friction braking force control in accordance with a collision avoidance braking mode is started during regenerative braking. Thereby, the vehicle can be slowed down with a deceleration for collision avoidance.

6 Claims, 10 Drawing Sheets

(56) References Cited

U.S. PATENT DOCUMENTS

| | | | |
|---|---|---|---|
| 2012/0200147 A1* | 8/2012 | Endo | B60T 8/38 303/3 |
| 2012/0280562 A1* | 11/2012 | Wu | B60T 1/10 303/152 |
| 2013/0211688 A1* | 8/2013 | Oguri | B60W 30/143 701/70 |
| 2013/0226380 A1* | 8/2013 | Ando | B60W 20/108 701/22 |
| 2013/0257140 A1* | 10/2013 | Ogiwara | B60T 13/586 303/3 |
| 2013/0297165 A1* | 11/2013 | Crombez | B60T 1/10 701/70 |
| 2014/0142797 A1* | 5/2014 | Otake | B60W 20/00 701/22 |
| 2015/0019057 A1* | 1/2015 | Morisaki | B60L 7/18 701/22 |
| 2015/0019097 A1* | 1/2015 | Morisaki | B60L 7/18 701/70 |
| 2015/0274018 A1* | 10/2015 | Crombez | B60L 7/18 701/22 |
| 2016/0052495 A1* | 2/2016 | Nakaso | B60T 7/22 701/70 |
| 2016/0264117 A1* | 9/2016 | Deng | B60T 11/18 |
| 2016/0347181 A1* | 12/2016 | Yamakado | B60L 7/18 |
| 2016/0375775 A1* | 12/2016 | Imanishi | B60T 1/10 701/70 |
| 2017/0008400 A1* | 1/2017 | Katsuta | B60L 3/0015 |
| 2017/0015203 A1* | 1/2017 | Oguri | B60L 7/18 |

FOREIGN PATENT DOCUMENTS

| | | | |
|---|---|---|---|
| JP | 2009-018721 A | | 1/2009 |
| JP | 2013-177026 A | | 9/2013 |
| JP | 2014-072545 | * | 3/2014 |
| JP | 2015-047045 A | | 3/2015 |

* cited by examiner

CONTROL UNIT FOR A VEHICLE

TECHNICAL FIELD

The present disclosure relates to a control unit for a vehicle, which assists a driver to avoid that a self-vehicle collides with an obstruction.

BACKGROUND ART

Conventionally, a vehicle comprising a collision avoidance assist device has been known. The collision avoidance assist device decelerates the vehicle by an automatic brake, when an obstruction, with which a self-vehicle will collide with a high possibility, is detected by a sensor, such as radar. For instance, a crash cushion proposed in the Patent Document 1 (PTL1), calculates a predicted collision time until a self-vehicle and an obstruction collide, brings an automatic brake 1 into operation when this predicted collision time becomes less than an assist time, and brings an automatic brake 2 into operation when this predicted collision time becomes less than a reduction time shorter than the assist time. This automatic brake 1 is a brake for warning and assisting a collision avoidance operation by a driver, and the automatic brake 2 is a brake for reducing the damage at the time of a collision of a vehicle and an obstruction. Therefore, the automatic brake 1 brings a vehicle to stop with a smaller deceleration as compared with that of the automatic brake 2. In addition, in this specification, the magnitude of deceleration refers to the absolute value of deceleration.

CITATION LIST

Patent Literature

[PTL1] Japanese Patent Application Laid-Open "kokai" No. 2009-18721

SUMMARY

By the way, a vehicle which decelerates using regenerative braking force is known. For instance, a hybrid vehicle and an electric vehicle comprises a regenerative braking device which gives regenerative braking force to a wheel by electric-power regeneration and a friction braking device which gives friction braking force to a wheel by brake oil pressure. In such a vehicle, regeneration coordination brake control is carried out. In the regeneration coordination brake control, driver-demanded braking force set up in accordance with the amount of a brake operation is distributed to demanded regenerative braking force and demanded friction braking force, and a regenerative braking device and a friction braking device generate the distributed demanded braking force, respectively.

When an automatic brake is brought into operation so that a self-vehicle does not collide with an obstruction, it is necessary to control the deceleration of the self-vehicle with a sufficient accuracy not only so that the self-vehicle does not collide with the obstruction in front, but also so that a following vehicle does not rear-end the self-vehicle. When an automatic brake is brought into operation, since it is difficult to property determine braking force to be generated by a regenerative braking device and braking force to be generated by a friction braking device so that demanded deceleration is attained, it is preferable to terminate a regeneration coordination brake control which has been carried out until then and to switch to a friction damping control in which a braking force is given to a wheel only with a friction braking device without using a regenerative braking device.

However, in the case where a device is configured so that regenerative braking is forbidden in time with an operation start of an automatic brake as mentioned above, when the automatic brake for a preparatory to collision avoidance (which is a brake corresponding to the conventional automatic brake 1 and will be referred to as a "preparatory brake" hereafter) operates during regenerative braking, deceleration may fall suddenly and a sense of discomfort may be given to a driver. The preparatory brake works so that a self-vehicle may be made to generate small deceleration, at a stage where emergency degree is not so high. For this reason, when regenerative braking force larger than friction braking force for generating a preparatory brake has been given to a wheel since before the preparatory brake is started, the regenerative braking force disappears instantly along with an operation start of the preparatory brake, and the deceleration of a self-vehicle falls suddenly.

For instance, in a vehicle which decelerates using regenerative braking force, what is called engine braking is generated by regenerative braking force while running during which an accelerator pedal and a brake pedal are not operated (this is referred to as pedal-off time). Since certain strength of regenerative braking force is demanded at the pedal-off time, the regenerative braking force is larger than friction braking force of a preparatory brake in most cases. Therefore, since regenerative braking force disappears suddenly and deceleration falls suddenly when a preparatory brake operates during a regenerative braking at the pedal-off time, there is a possibility that sense of discomfort may be given to a driver.

The present disclosure has been conceived in order to solve the above-mentioned problem, and is intended to provide a control unit for a vehicle, which can starting the above-mentioned preparatory brake during regenerative braking without giving sense of discomfort to a driver as much as possible and realize suitable deceleration when performing automatic brake for collision avoidance.

In order to attain the above-mentioned objective, a feature of the present disclosure is in;

a control unit for a vehicle, which is applied to a vehicle comprising a regenerative braking device that generates electric power by a wheel rotated by external force, collects the generated electric power in an on-vehicle battery, and gives regenerative braking force to said wheel, and a friction braking device that gives friction braking force to said wheel by brake oil pressure, and which comprises, an indicator acquisition means to acquire an indicator which represents a height of a possibility that a self-vehicle collides with an obstruction, and a collision avoidance assist control means to assist a driver so that a collision of said self-vehicle with said obstruction is avoided by giving friction braking force by said friction braking device to said wheel without using regenerative braking force by said regenerative braking device and decelerating said self-vehicle, based on said indicator, wherein:

said collision avoidance assist control means comprises, a first deceleration control means to start its operation and to decelerate said self-vehicle with a collision avoidance preparatory deceleration by said friction braking force, when said indicator exceeds an avoidance preparatory threshold value, a second deceleration control means to start its operation and to decelerate said self-vehicle with a collision avoidance deceleration, which is larger than said collision avoidance preparatory deceleration, by said friction braking force, when said indicator exceeds a collision avoidance threshold value, which is larger than said avoidance preparatory threshold value, and a regeneration end control means to gradually decrease the regenerative braking force which said regenerative braking device is generating when said first deceleration control means starts its operation in a situation where said regenerative braking device is generating regenerative braking force, and to decrease the regenerative braking force which said regenerative braking device is generating at a higher rate, as compared with the case where said first deceleration control means starts its operation, when said second deceleration control means starts its operation in a situation where said regenerative braking device is generating regenerative braking force.

A control unit for a vehicle, according to the present disclosure, is applied to a vehicle comprising a regenerative braking device that generates electric power by a wheel rotated by external force, collects the generated electric power in an on-vehicle battery, and gives regenerative braking force to the wheel, and a friction braking device that gives friction braking force to the wheel by brake oil pressure. The control unit for a vehicle comprises an indicator acquisition means and a collision avoidance assist control means, as means for avoiding that a self-vehicle collides with an obstruction.

The indicator acquisition means acquires an indicator which represents a height of a possibility that a self-vehicle collides with an obstruction. As the indicator which represents the height of the possibility that the self-vehicle collides with the obstruction, a predicted collision time which is a predicted time until the self-vehicle collides with the obstruction can be used, for example. The shorter this predicted collision time becomes, the larger the indicator which represents the height of the possibility that the self-vehicle collides with the obstruction becomes.

The collision avoidance assist control means assists a driver so that a collision of the self-vehicle with the obstruction is avoided by giving friction braking force by the friction braking device to the wheel without using regenerative braking force by the regenerative braking device and decelerating the self-vehicle, based on the indicator, when an obstruction with which the self-vehicle will collide with a high possibility is detected.

This collision avoidance assist control means comprises a first deceleration control means, a second deceleration control means and a regeneration end control means. The first deceleration control means starts its operation and decelerates the self-vehicle with a collision avoidance preparatory deceleration by the friction braking force, when the indicator exceeds an avoidance preparatory threshold value. Namely, an automatic brake for collision avoidance preparatory is performed by the friction braking force.

The second deceleration control means starts its operation and decelerates the self-vehicle with a collision avoidance deceleration, which is larger than the collision avoidance preparatory deceleration, by the friction braking force, when the indicator exceeds a collision avoidance threshold value, which is larger than the avoidance preparatory threshold value. Namely, an automatic brake for collision avoidance preparatory is performed by the friction braking force. Thereby, a driver can be assisted so that the collision of the self-vehicle with the obstruction is avoided.

For instance, the first deceleration control means can raise a brake oil pressure of a wheel cylinder so that the second deceleration control means can generate a large braking force immediately, before the second deceleration control means operates and generates a large friction braking force for collision avoidance. Moreover, it is preferable that the first deceleration control means is configured to turn on a brake lamp when decelerating the self-vehicle by the friction braking force, for example. In that case, attention of a driver of a following vehicle can be called.

The first deceleration control means is configured to decelerate the self-vehicle with the collision avoidance preparatory deceleration by the friction braking force without using the regenerative braking force. Since this collision avoidance preparatory deceleration is just deceleration generated for a preparatory made before the second deceleration control means starts its operation, it is small. For this reason, when the regenerative control equipment is generating regenerative braking force at a the start of the operation of the first deceleration control means, the collision avoidance preparatory deceleration is smaller than the deceleration generated by the regenerative braking in many cases. Then, the regeneration end control means gradually decreases the regenerative braking force which the regenerative braking device is generating when the first deceleration control means starts its operation in a situation where the regenerative braking device is generating regenerative braking force. Thereby, a sense of discomfort given to a driver can be reduced as much as possible.

Moreover, the regeneration end control means decrease the regenerative braking force which the regenerative braking device is generating at a higher rate, as compared with the case where the first deceleration control means starts its operation, when the second deceleration control means starts its operation in a situation where the regenerative braking device is generating regenerative braking force. For instance, the regeneration end control means causes the regenerative braking force to disappear as early as possible, when the second deceleration control means starts its operation in a situation where the regenerative braking device is generating regenerative braking force. Thereby, influence of the regenerative braking force can be reduced as much as possible, and the deceleration of the self-vehicle can be controlled properly. Therefore, collision avoidance can be performed properly.

A feature of one aspect of the present disclosure is in that, said first deceleration control means is configured to control said friction braking force so that said self-vehicle decelerates with a target collision avoidance preparatory deceleration which is a target value of said collision avoidance preparatory deceleration, and to turn on a brake lamp.

It is desired to call attention of a driver of a following vehicle before bringing a large automatic brake into action so that the self-vehicle does not collide with the obstruction. On the other hand, by laws and regulations, in order to turn on a brake lamp, it is necessary to decelerate a self-vehicle with a predetermined deceleration. Then, in the one aspect of the present disclosure, the first deceleration control means controls the friction braking force so that the self-vehicle decelerates with a target collision avoidance preparatory deceleration which is a target value of the collision avoidance preparatory deceleration, and turns on a brake lamp. Therefore, the brake lamp can be turned on properly in a preparatory stage, and attention of a driver of a following vehicle can be called.

A feature of one aspect of the present disclosure is in that, said second deceleration control means is configured to calculate a target collision avoidance deceleration which is a target value of said collision avoidance deceleration based on a distance from said self-vehicle to an obstruction and a relative velocity of said self-vehicle with respect to said obstruction, and to control said friction braking force so that said self-vehicle decelerates with said calculated target collision avoidance deceleration, and an increase rate of said friction braking force at a time of an operation start of said first deceleration control means is set up smaller than an increase rate of said friction braking force at a time of an operation start of said second deceleration control means.

In accordance with the one aspect of the present disclosure, the self-vehicle can be decelerated with a proper collision avoidance deceleration. Therefore, a high collision avoidance performance can be obtained. In addition, the target collision avoidance deceleration can be calculated at least based on a distance from the self-vehicle to an obstruction and a relative velocity of the self-vehicle with respect to the obstruction, and other parameters may be considered in addition to the above.

When the first deceleration control means starts its operation and raises the friction braking force at a high rate so that the deceleration of the self-vehicle reaches the target collision avoidance preparatory deceleration in a case where the self-vehicle is not in a braking state, there is a possibility that a sense of discomfort is given to a driver due to an alteration of the deceleration. Moreover, in a case where the first deceleration control means starts control of the friction braking force, an emergency degree is not so high, as compared with a case where the second deceleration control means starts control of the friction braking force. Then, in the one aspect of the present disclosure, an increase rate of the friction braking force at a time of an operation start of the first deceleration control means is set up smaller than an increase rate of the friction braking force at a time of an operation start of the second deceleration control means. Therefore, in accordance with the one aspect of the present disclosure, a sense of discomfort can be further successfully prevented from being given to a driver, while maintaining a high collision avoidance performance.

Although reference signs used in embodiments are attached in parentheses to constituent elements of the present disclosure corresponding to the embodiments in order to help understanding of the present disclosure in the above-mentioned explanation, respective constituent elements of the present disclosure are not limited to the embodiments specified with the above-mentioned reference signs.

DESCRIPTION OF EMBODIMENTS

Figure 1:
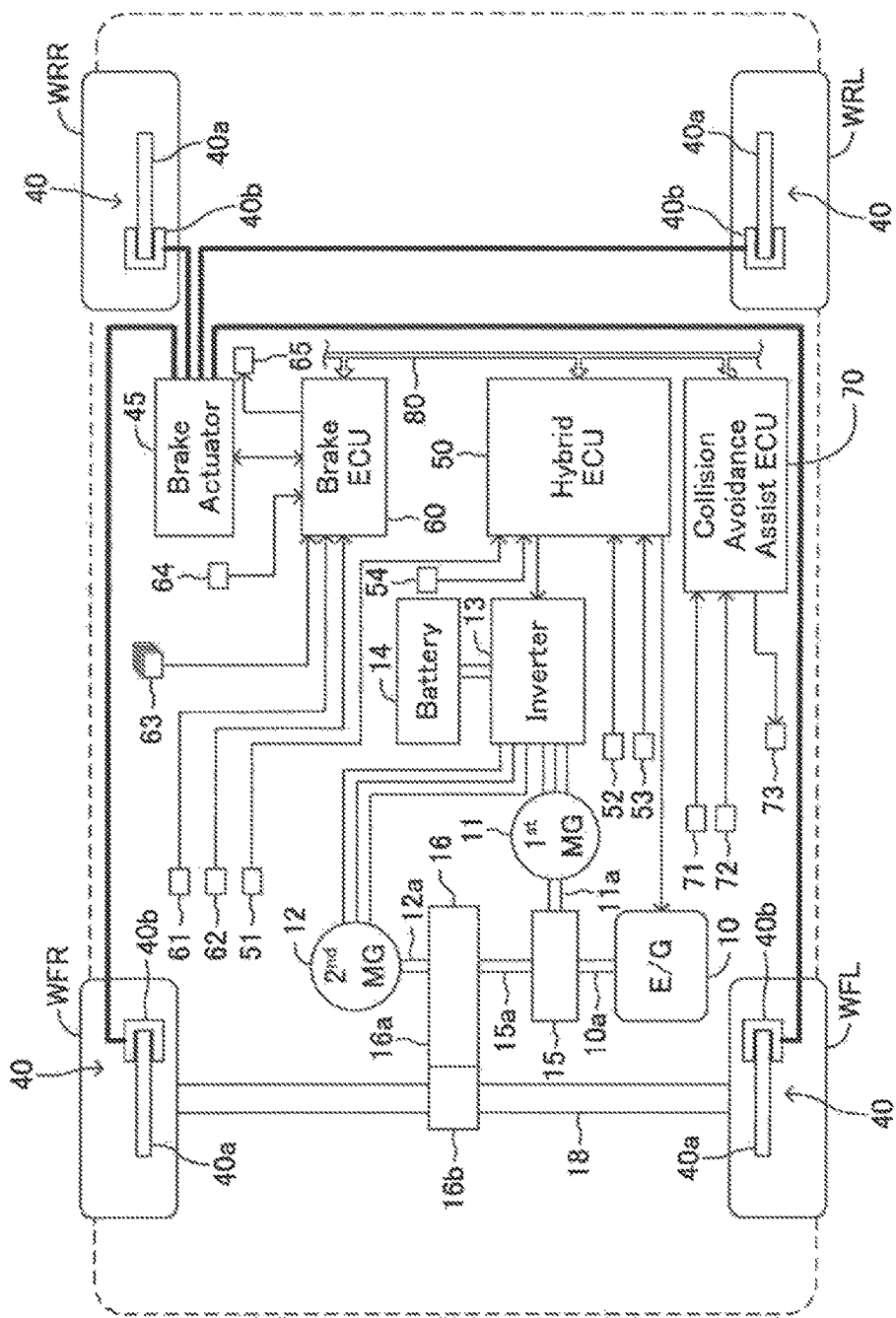
FIG. 1 is a schematic system configuration diagram of a control unit for a vehicle according to the present embodiment.

Hereafter, embodiments of the present disclosure will be explained in detail using drawings. FIG. 1 is a schematic system configuration diagram of a control unit for a vehicle according to the present embodiment.

A vehicle to which the control unit for a vehicle according to the present embodiment is applied is a hybrid vehicle. This vehicle comprises, as a running drive unit, an engine 10, a first motor generator 11 (referred to as a first MG11), a second motor generator 12 (referred to as a second MG12), an inverter 13, a battery 14, a motive-power distribution mechanism 15, a driving-force transmission mechanism 16, and a hybrid ECU 50. In addition, the ECU is an abbreviation for an Electric Control Unit.

Although the engine 10 is a gasoline engine, it may be a diesel engine.

The motive-power distribution mechanism 15 distributes driving force of the engine 10 to motive power which drives its own output shaft 15a and motive power which drives the first MG11 as a dynamo (electric generator). The motive-power distribution mechanism 15 is constituted by a planetary gear mechanism which is not shown. The planetary gear mechanism comprises a sun gear, pinion gears, a planetary carrier, and a ring gear (not shown). A rotation shaft of the planetary carrier is connected to a driving shaft 10a of the engine 10, and transmits motive power to the sun gear and the ring gear through the pinion gears. A rotation shaft of the sun gear is connected to a rotation shaft 11a of the first MG11, and makes the first MG11 generate electric power by the motive power transmitted from the sun gear. A rotation shaft of the ring gear is connected to the output shaft 15a of the motive-power distribution mechanism 15.

The output shaft 15a of the motive-power distribution mechanism 15 and a rotation shaft 12a of the second MG12 are connected to the driving-force transmission mechanism 16. The driving-force transmission mechanism 16 comprises a reduction gear train 16a and a differential gear 16b, and is connected to a wheel driving shaft 18. Therefore, torque from the output shaft 15a of the motive-power distribution mechanism 15 and torque from the rotation shaft 12a of the second MG12 are transmitted to left and right driving wheels WFL and WFR through the driving-force transmission mechanism 16.

The above-mentioned motive-power distribution mechanism 15 and the driving-force transmission mechanism 16 are well-known, their configurations and operations are described, for example, in Japanese Patent Application Laid- Open "kokai" No. 2013-177026 official report, etc., and the well-known technologies can be applied to the present disclosure.

The first MG11 and the second MG12 are respectively permanent-magnet type synchronous motors, and are connected to the inverter 13. The inverter 13 comprises independently a first inverter circuit for driving the first MG11 and a second inverter circuit for driving the second MG12. When operating the first MG11 or the second MG12 as a motor, the inverter 13 converts direct-current (DC) electric power supplied from the battery 14 into three-phase alternating current (AC) electric power, and supplies the converted alternative-current electric power independently to the first MG11 or the second MG12.

Moreover, the first MG11 and the second MG12 generate electric power in a situation where a rotation shaft is rotated by external force. When operating the first MG11 or the second MG12 as a dynamo, the inverter 13 converts the three-phase generated electric power outputted from the first MG11 or the second MG12 into direct-current electric power, and charges the converted direct-current electric power in the battery 14. By this charge (electric-power regeneration) to the battery 14, the driving wheels WFR and WFL can be made to generate regenerative braking force.

The engine 10 and the inverter 13 are controlled by the hybrid ECU 50. The hybrid ECU 50 comprises a microcomputer as a principal part. In the present specification, the microcomputer comprises a CPU and a storage device, such as a ROM and a RAM, and the CPU is configured to attain various functions by performing instructions (program) stored in the ROM. The hybrid ECU 50 is connected to an accelerator sensor 51 which detects an accelerator operation amount AP, various kinds of sensors (referred to as engine control sensors 52) which are needed for control of the engine 10, various kinds of sensors (referred to MG control sensors 53) which are needed for control of the first MG11 and the second MG12, and an SOC sensor 54 which detects the charge status (SOC: State Of Charge) of the battery 14.

The hybrid ECU 50 is connected to other in-vehicle ECUs, such as a brake ECU 60 and a collision avoidance assist ECU 70, etc., which will be mentioned later, through a CAN 80 (Control unit Area Network) so that the hybrid ECU 50 can mutually communicate with these ECUs, transmits various kinds of control information and demand signals to the other in-vehicle ECUs, and receives those control information and demand signals from the other in-vehicle ECUs. The hybrid ECU 50 acquires information representing speed Vx of the self-vehicle transmitted from the brake ECU 60 through the CAN 80.

The hybrid ECU 50 calculates driver-demanded torque Td* required for running, referring to a driver-demanded torque map which is not shown, based on the accelerator operation amount AP (accelerator opening %) and the vehicle speed Vx. The driver-demanded torque Td* is a torque required for running of a vehicle, and is a torque required for the wheel driving shaft 18.

The hybrid ECU 50 calculates an engine-demanded output power, a first MG-demanded torque and a second MG-demanded torque, etc., in accordance with a predetermined rule, based on this driver-demanded torque Td*, the SOC value of the battery 14, rotational speeds of the first MG11 and the second MG12, etc. Calculation methods of such demand values are also well-known, for instance, described in Japanese Patent Application Laid-Open "kokai" No. 2013-177026 official report, etc., and the well-known technologies can be applied to the present disclosure.

The hybrid ECU 50 controls the inverter 13 based on the first MG-demanded torque and the second MG-demanded torque. Thereby, the first MG-demanded torque is generated in the first MG11, and the second MG-demanded torque is generated in the second MG12. These demanded torques may be driving torques which give driving force to the driving wheels WFL and WFR in some cases, and they may be braking torques which give braking force to the driving wheels WFL and WFR in some other cases. The hybrid ECU 50 makes the driving wheels WFR and WFL generate regenerative braking force so that a vehicle decelerates (slows down) with deceleration set up in accordance with the vehicle speed Vx, when the accelerator operation amount AP (accelerator opening %) is zero and a brake operation amount BP is zero.

The hybrid ECU 50 operates an actuator for engine control, which is not shown, based on the engine-demanded driving torque, and carries out fuel injection control, lighting control and intake air amount control. Thereby, the engine 10 is driven to generate the engine-demanded output power.

The hybrid ECU 50 makes a vehicle run only by driving torque of the second MG12, while stopping the engine 10, when the vehicle starts moving or when the vehicle runs at low speed. In this case, the first MG11 is controlled not to generate driving resistance. Therefore, the second MG12 can drive the driving wheels WFL and WFR efficiently, without receiving drag resistance.

The hybrid ECU 50 distributes the driving force of the engine 10 to two lines by the motive-power distribution mechanism 15, transmits one of them to the driving wheels WFL and WFR as driving force and transmits the other to the first MG11 at the time of steady running. Thereby, the first MG11 generates electric power. A part of this generated electric power is supplied to the battery 14. The second MG12 is driven with the electric power which first MG11 generates and the electric power supplied from the battery 14, and assists the drive of the engine 10.

The hybrid ECU 50 operates the second MG12 as a dynamo by rotating the second MG12 with the motive power transmitted from the driving wheels WFL and WFR, and collects the generated electric power in the battery 14 (regeneration), while stopping the engine 10, at the time of deceleration (at the time of release of an accelerator, i.e., accelerator-off) and at the time of a braking operation (at the time of an operation of a brake pedal, i.e., brake-on).

In addition, the hybrid ECU 50 may be divided into and constituted by an engine control part in charge of control of the engine 10, an MG control part in charge of control of the first MG11 and the second MG12, and a power management part which overall controls driving force generated in the whole vehicle, for example.

Moreover, the vehicle comprises a friction brake mechanism 40, a brake actuator 45, and a brake ECU 60. The friction brake mechanism 40 is disposed respectively in left-and-right front wheels WFL and WFR and left-and-right rear wheels WRL and WRR (hereafter, referred to as a wheel W when referring them collectively). The friction brake mechanism 40 comprises a brake disc 40a fixed to the wheel W and a brake caliper 40b fixed to a vehicle body, and pushes a brake pad against the brake disc 40a by operating a wheel cylinder built in the brake caliper 40b with oil pressure of operating oil (hydraulic oil) supplied from the brake actuator 45 to generate friction braking force. In addition, since this friction braking force is generated by oil pressure control of the operating oil, friction braking force may be referred to as oil pressure braking force.

The brake actuator 45 is a well-known actuator which adjusts the oil pressure supplied to the wheel cylinder built in the brake caliper 40b independently for each wheel. In addition to a tread force hydraulic circuit which supplies oil pressure to a wheel cylinder from a master cylinder which pressurizes operating oil by tread force of a brake pedal, this brake actuator 45 comprises a control hydraulic circuit which supplies controllable control oil pressure independently to each wheel cylinder regardless of the tread force of a brake pedal. The control hydraulic circuit comprises a motive-power oil pressure generator which has a booster pump and an accumulator and generates high oil pressure, a control valve which adjusted the oil pressure that the motive-power oil pressure generator outputs and supplies oil pressure controlled to be target oil pressure for every wheel cylinder, and an oil pressure sensor which detects the oil pressure of each wheel cylinder, etc. (the above-mentioned members which constitutes the brake actuator 45 are not shown in drawings).

The brake ECU 60 comprises a microcomputer as a principal part, is connected to the brake actuator 45, and controls the operation of the brake actuator 45. The brake ECU 60 is connected to other in-vehicle ECUs, such as the hybrid ECU 50 and a collision avoidance assist ECU 70 (which will be mentioned later) through the CAN 80 so that the brake ECU 60 can mutually communicate with these ECUs. The brake ECU 60 is connected to a brake sensor 61 which detect a brake operation amount BP that is an operation amount of a brake pedal, a brake switch 62 which detects that the brake pedal is operated, four sets as a total of wheel-speed sensors 63 which detect wheel-speeds ωh of respective left-and-right front-and-rear wheels W, a motion state sensor 64 to detect a vehicle motion state, such as a longitudinal acceleration and a yaw rate of a vehicle of a vehicle, and a brake lamp 65 (which may be referred to as a stop lamp). Moreover, the brake ECU 60 turns on the brake lamp 65 to call attention of a driver of a following vehicle when the brake switch 62 is turned on.

The brake ECU 60 sets up driver-demanded deceleration according to the brake operation amount BP, and calculates a target braking force with which this driver-demanded deceleration is attained. The brake ECU 60 distributes this target braking force to demanded friction braking force and demanded regenerative braking force in accordance with a predetermined distribution characteristic, and transmits a regenerative braking demand instruction representing demanded regenerative braking force to the hybrid ECU 50. The hybrid ECU 50 generates regenerative braking force by second MG12 based on the demanded regenerative braking force, and transmits information representing actual regenerative braking force, which is actually generated regenerative braking force, to the brake ECU 60. In a situation where regenerative braking is possible (a situation where electric power can be collected in the battery 14), target braking force is preferentially distributed to demanded regenerative braking force. Therefore, while target braking force is small, 100% thereof is distributed to demanded regenerative braking force, and is not distributed to demanded friction braking force.

The brake ECU 60 corrects demanded friction braking force with a difference value between demanded regenerative braking force and actual regenerative braking force, and calculates respective wheel demanded friction braking force for four wheels by distributing the corrected demanded friction braking force to the four wheels. The brake ECU 60 controls fluid pressure of each wheel cylinder so that each friction brake mechanism 40 generates each wheel demanded friction braking force by controlling electrification to a linear control valve prepared in the brake actuator 45.

Such a control in which the brake ECU 60 and the hybrid ECU 50 cooperate as mentioned above to generate target braking force according to a brake operation amount BP with regenerative braking force and friction braking force is referred to as a regeneration coordination brake control.

The brake ECU 60 calculates the vehicle speed Vx (vehicle body speed) based on wheel-speed ωh of each wheel detected by the wheel-speed sensor 63, and provides the in-vehicle ECU with vehicle speed information through the CAN 80.

The vehicle comprises a collision avoidance assist ECU 70. The collision avoidance assist ECU 70 comprises a microcomputer as a principal part, and is connected to other in-vehicle ECUs, such as the hybrid ECU 50 and the brake ECU 60, through the CAN 80 so that the collision avoidance assist ECU 70 can mutually communicate with these ECUs.

The collision avoidance assist ECU 70 is connected to a radar sensor 71, a camera sensor 72, and an annunciator 73.

For example the radar sensor 71 irradiates an electric wave in a millimeter wave band ahead of a self-vehicle, receives a reflected wave from an obstruction, calculates an existence of the obstruction ahead of the self-vehicle, distance with an obstruction, a relative velocity with an obstruction, etc., and outputs a calculation result to the collision avoidance assist ECU 70. The camera sensor 72 takes a photograph of a view ahead of the self-vehicle and analyzes the photographed image to identify a type (kind) (such as a vehicle, a pedestrian, etc.) of an obstruction, and outputs identification information to the collision avoidance assist ECU 70. The annunciator 73 comprises a buzzer and a display, calls attention of a driver by sound of the buzzer, and indicates an operation state of a collision avoidance assist control on the display.

The collision avoidance assist ECU 70 calculates a predicted collision time TTC, which is a predicted time until the self-vehicle collides with an obstruction detected by the radar sensor 71 (remaining time until they collide), based on a distance L between the obstruction and the self-vehicle and a relative velocity Vr of the self-vehicle with respective to the obstruction, in accordance with the following formula (1).

$$TTC = \frac{L}{Vr} \quad (1)$$

This predicted collision time TTC serves as an indicator which represents a height of a possibility that a self-vehicle collides with an obstruction. The shorter the predicted collision time TTC is, the higher the possibility that a self-vehicle collides with an obstruction is.

Based on this predicted collision time TTC, the collision avoidance assist ECU 70 transmits a brake instruction (mode information and controlled variable information, which will be mentioned later) to the brake ECU 60, when the possibility that the self-vehicle will collide with the obstruction based is high, makes the left-and-right front-and-rear wheels W generate friction braking force, and assists a driver so that the self-vehicle can avoid a collision with the obstruction. Such a control in which the collision avoidance assist ECU 70 makes the right-and-left front-and-rear wheels W generate braking force through the brake ECU 60 as mentioned above is referred to as a collision avoidance assist control.

Hereafter, it may be referred to as an automatic brake to make the right-and-left front-and-rear wheels W generate desired braking force, regardless of the existence of a brake pedal operation by a driver.

The collision avoidance assist ECU 70 carries out the collision avoidance assist control based on the predicted collision time TTC. In the collision avoidance assist control, control modes are switched based on the predicted collision time TTC. The control modes are categorized into an assist unnecessary mode, an alarm mode, a first preparatory braking mode, a second preparatory braking mode, a collision avoidance braking mode, and a braking hold mode, in ascending order of urgency (in descending order according to the length of the predicted collision time TTC).

Figure 2:
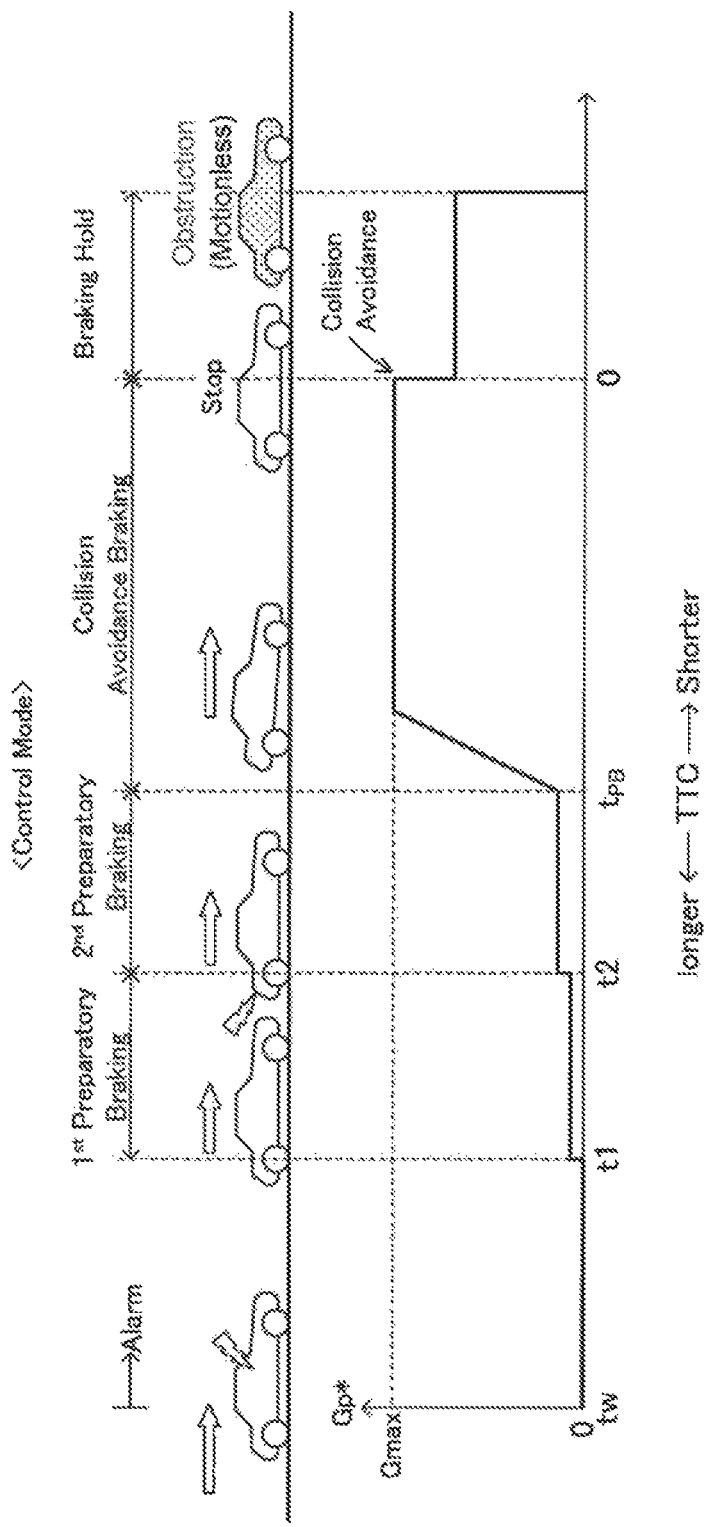
FIG. 2 is a diagram for showing an alteration of modes and an alteration of demanded deceleration Gp* in a collision avoidance assist control.

In the collision avoidance assist control, when the self-vehicle approaches the obstruction gradually, the control mode is switched in the above-mentioned order. FIG. 2 is a diagram for showing an alteration of modes and an alteration of demanded deceleration Gp* in a collision avoidance assist control. This drawing shows a case where the obstruction remains still and the control mode is being switched from the alarm mode, in an order as mentioned above.

The alarm mode is a mode in which the annunciator 73 (for instance, a buzzer) is operated to call attention of a driver. In addition, even when the control mode is switched to another control mode and the automatic brake is started thereafter, the alarm mode is carried out in parallel with the control mode when the possibility that the self-vehicle collides with an obstruction is high.

The first preparatory braking mode is a mode in which it is prepared so that a brake pad can be immediately pushed against the brake disc 40a and big friction braking force can be generated, by raising pressure in the control hydraulic circuit of the brake actuator 45 and making the brake pad lightly contact with the brake disc 40a, in preparation for the collision avoidance braking mode. In this first preparatory braking mode, a vehicle is decelerated with friction braking force.

The second preparatory braking mode is a mode in which a vehicle is decelerated with a predetermined deceleration in order to turn on the brake lamp 65 and to call attention of a driver of a following vehicle, in preparation for the collision avoidance braking mode. The brake lamp 65 cannot be turned on unless it is under a situation where the vehicle is decelerated with a predetermined deceleration, by laws and regulations. Therefore, the second preparatory braking mode as mentioned above is included in the collision avoidance assist control.

The collision avoidance braking mode is a mode in which large braking force is generated in four wheels so that a self-vehicle does not collide with an obstruction. The braking force generated in this collision avoidance braking mode is set to a well-considered value, not only so that a self-vehicle does not collide with an obstruction, but also so that a following vehicle can be prevented from rear-ending the self-vehicle (clash against the self-vehicle from behind) as much as possible.

The braking hold mode is a mode in which braking force in four wheels is hold for a certain period of time so that a self-vehicle does not carry out a creep running, after an automatic brake is carried out by the collision avoidance braking mode and the self-vehicle stops. Therefore, the braking hold mode is carried out after the end of the collision avoidance braking mode, regardless of the predicted collision time TTC.

Figure 3:
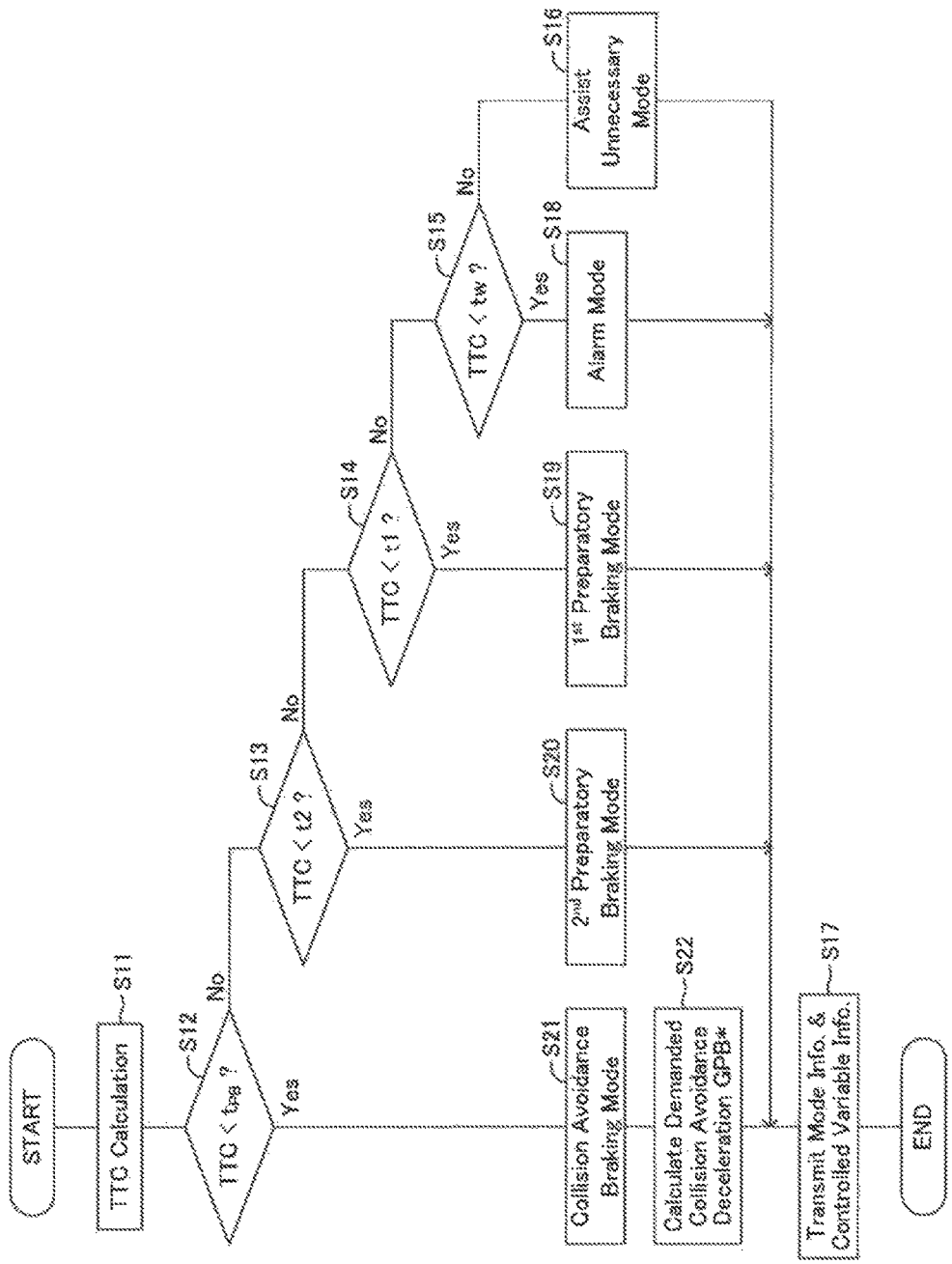
FIG. 3 is a flowchart for showing a collision avoidance assist control routine.

FIG. 3 shows the collision avoidance assist control routine which the collision avoidance assist ECU 70 carries out. In a period during which an ignition switch is being turned on, the collision avoidance assist control routine is carried out repeatedly in a predetermined short calculation period.

The collision avoidance assist ECU 70 calculates the predicted collision time TTC at present in accordance with the above-mentioned formula (1) in step S11. Then, in step S12, the collision avoidance assist ECU 70 judges whether the predicted collision time TTC is shorter than the collision avoidance threshold value tPB. When the predicted collision time TTC is not shorter than the collision avoidance threshold value tPB (S12: No), the collision avoidance assist ECU 70 judges whether the predicted collision time TTC is shorter than a second avoidance preparatory threshold value t2 in step S13. When the predicted collision time TTC is not shorter than the second avoidance preparatory threshold value t2 (S13: No), the collision avoidance assist ECU 70 judges whether the predicted collision time TTC is shorter than a first avoidance preparatory threshold value t1 in step S14. When the predicted collision time TTC is not shorter than the first avoidance preparatory threshold value t1 (S14: No), the collision avoidance assist ECU 70 judges whether the predicted collision time TTC is shorter than an alarm threshold value tw in step S15. In addition, the lengths of respective threshold values are set as tPB<t2<t1<tw.

When the predicted collision time TTC is not shorter than the alarm threshold value tw, i.e., when a possibility that the self-vehicle collides with an obstruction in front is low, the collision avoidance assist ECU 70 sets the control mode to the assist unnecessary mode in step S16. Then, the collision avoidance assist ECU 70 transmits mode information representing that the control mode is the assist unnecessary mode and controlled variable information representing that the demanded deceleration Gp* is zero to the CAN 80 in step S17.

When such processing is repeated, the self-vehicle approaches the obstruction and the predicted collision time TTC becomes less than the alarm threshold value tw (t1≤TTC<tw), the collision avoidance assist ECU 70 sets the control mode to the alarm mode and made the buzzer of the annunciator 73 sound in step S18. In this case, the collision avoidance assist ECU 70 transmits mode information representing that the control mode is the alarm mode and controlled variable information representing that the demanded deceleration Gp* is zero to the CAN 80 in step S17.

When such processing is repeated and the predicted collision time TTC becomes further shorter to become less than the first avoidance preparatory threshold value t1 (t2≤TTC<t1), the collision avoidance assist ECU 70 sets the control mode to the first preparatory braking mode in step S19. In this case, the collision avoidance assist ECU 70 transmits mode information representing that the control mode is the first preparatory braking mode and the controlled variable information representing preparatory setting pressure to the CAN 80 in step S17. This preparatory setting pressure corresponds to the target oil pressure in the present disclosure.

When such processing is repeated and the predicted collision time TTC becomes further shorter to become less than the second avoidance preparatory threshold value t2 (tPB≤TTC<t2), the collision avoidance assist ECU 70 sets the control mode to the second preparatory braking mode in step S20. In this case, the collision avoidance assist ECU 70 transmits mode information representing that the control mode is the second preparatory braking mode and controlled variable information represents that the demanded deceleration Gp* is demanded second preparatory deceleration G2*

(Gp*=G2*) to the CAN 80 in step S17. This demanded second preparatory deceleration G2* is equivalent to the target collision avoidance preparatory deceleration in the present disclosure.

When such processing is repeated and the predicted collision time TTC becomes further shorter to become less than the collision avoidance threshold value tPB (TTC<tPB), the collision avoidance assist ECU 70 sets the control mode to the collision avoidance braking mode in step S21. Then, the collision avoidance assist ECU 70 calculates a demanded collision avoidance deceleration GPB* in step S22.

The demanded collision avoidance deceleration GPB* can be calculated as follows. For example, in a case where the obstruction has stopped, when speed (=relative velocity) of a self-vehicle is V, deceleration of the self-vehicle is a, and a time period until vehicle stop, at present, a running distance X until the self-vehicle stops can be represented by the following formula (2).

$$X = V*t + \frac{1}{2}*a*t^2 \quad (2)$$

Moreover, the time t until vehicle stop can be represented by the following formula (3).

$$t = \frac{V}{a} \quad (3)$$

Therefore, the running distance X until the self-vehicle stops can be represented by the following formula (4) by assigning the formula (3) to the formula (2).

$$X = -\frac{V^2}{2a} \quad (4)$$

What is necessary in order to stop a vehicle a distance 3 short of an obstruction is just to calculate deceleration by setting this running distance X as a distance (L−β) which is obtained by subtracting the distance β from a distance L detected by the radar sensor 71. In addition, what is necessary is just to calculate this running distance X just using a relative velocity and a relative deceleration with respect to an obstruction, when the obstruction is running.

As the demanded collision avoidance deceleration GPB*, thus calculated deceleration a is adopted. In addition, an upper limit Gmax is set for the demanded collision avoidance deceleration GPB*, and the demanded collision avoidance deceleration GPB* is set to the upper limit Gmax when a calculated demanded collision avoidance deceleration GPB* exceeds the upper limit Gmax. This demanded collision avoidance deceleration GPB* is equivalent to the target collision avoidance deceleration in the present disclosure.

Then, the collision avoidance assist ECU 70 transmits mode information representing that the control mode is the collision avoidance braking mode and controlled variable information representing that the demanded deceleration Gp* is the demanded collision avoidance deceleration GPB* (Gp*=GPB*) to the CAN 80 in step S17.

The collision avoidance assist ECU 70 repeatedly carries out such processing according to the predicted collision time TTC in a predetermined calculation period.

In addition, the collision avoidance assist ECU 70 advances the processing to another braking hold routine (not shown) from the collision avoidance assist control routine, when a stop of a vehicle is detected (vehicle speed Vx=0) after the control mode is set to the collision avoidance braking mode. In the braking hold routine, the collision avoidance assist ECU 70 transmits mode information representing that the control mode is the braking hold mode and controlled variable information representing that the demanded deceleration Gp* is a demanded braking hold deceleration GBH*(Gp*=GBH*) to the CAN 80 only for a predetermined time period (for instance, several seconds).

Moreover, although not shown in the collision avoidance assist control routine of FIG. 2, when the control mode is set to the collision avoidance braking mode, even though the predicted collision time TTC becomes longer thereafter, the collision avoidance braking mode is continued until a self-vehicle stops regardless of the length of the predicted collision time TTC. Moreover, in a case where the control mode is set to the first preparatory braking mode or the second preparatory braking mode and the predicted collision time TTC increases to a value which is the first avoidance preparatory threshold value t1 or the second avoidance preparatory threshold value t2 or more (i.e., when an emergency degree falls), the control mode is not changed at that time. In this case, at a time when the duration time at which the predicted collision time TTC exceeds a predetermined release threshold value reaches a set time period, the first preparatory braking mode or the second preparatory braking mode is ended.

Although switching of the control modes in a situation where a possibility that a self-vehicle collides with an obstruction becomes higher from lower (situation where the predicted collision time TTC becomes shorter from longer) has been explained in the above-mentioned explanation, the situation does not necessarily become as explained above. For instance, in a case where an obstruction suddenly jumps in front of a self-vehicle from the side while the self-vehicle is running, etc., the control mode is determined in accordance with the predicted collision time TTC in that moment. For this reason, for example, the control mode may be set directly to the collision avoidance braking mode, the second preparatory braking mode, or the first preparatory braking mode, from a situation where the control mode has been set to the assist unnecessary mode. In addition, it is preferable that the collision avoidance assist ECU 70 operates the annunciator 73 when the control mode is set to any of the braking modes (the first preparatory braking mode, the second preparatory braking mode, and the collision avoidance braking mode) jumping over the alarm mode.

As mentioned above, the brake ECU 60 distributes the target braking force to the demanded friction braking force and the demanded regenerative braking force in accordance with a predetermined distribution characteristic by the regeneration coordination brake control. However, when an automatic brake is performed by the collision avoidance assist ECU 70, it is necessary to control the deceleration with high accuracy. When operating an automatic brake, it is difficult to define properly the demanded friction braking force and demanded regenerative braking force which should be generated so that a demanded deceleration is attained. Then, the brake ECU 60 ends the regeneration coordination brake control and forbids the hybrid ECU 50 from generating regenerative braking force when the control mode set up by the collision avoidance assist ECU 70 is a control mode in which braking force is generated (the first preparatory braking mode, the second preparatory braking mode, the collision avoidance braking mode, or braking hold mode).

The hybrid ECU 50 generates braking force equivalent to engine braking by regenerative braking force while running during which an accelerator pedal and a brake pedal are not operated (this is referred to as pedal-off time). The brake ECU 60 also forbids the hybrid ECU 50 from regenerative braking at the time of this pedal-off time. Therefore, the vehicle is decelerated (slowed down) only by friction braking force. In this case, the hybrid ECU 50 controls the inverter 13 so that the first MG11 and the second MG12 do not generate regenerative braking force.

Figure 4:
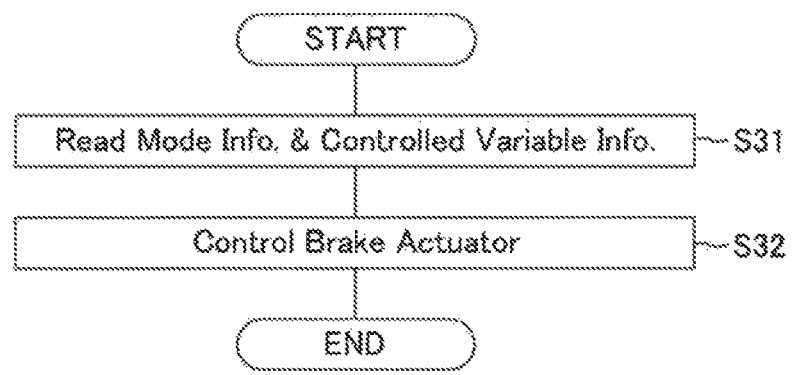
FIG. 4 is a flowchart for showing a braking control routine for a collision avoidance assist.

Next, processing performed by the brake ECU 60 will be explained. FIG. 4 shows a braking control routine for a collision avoidance assist routine, which the brake ECU 60 carries out. In a period during which an ignition switch is turned on, the braking control routine for a collision avoidance assist is carried out repeatedly in a short predetermined calculation period.

Once the braking control routine for a collision avoidance assist starts, the brake ECU 60 will read the mode information and controlled variable information transmitted through the CAN 80 in step S31. Then, in step S32, brake ECU 60 operates the brake actuator 45 and gives the friction braking force according to a demanded control amount (controlled variable) to the wheels W, based on the mode information and the controlled variable information. The brake ECU 60 repeatedly carries out the processing in steps S31 and S32 in a predetermined calculation period. Hereafter, the concrete processing in step S32 will be explained.

When the mode information represents that the control mode is the assist unnecessary mode or the alarm mode, the brake ECU 60 does not generate braking force related to the collision avoidance assist control.

When the mode information represents that the control mode is the first preparatory braking mode, the brake ECU 60 controls the brake actuator 45 based on the preparatory setting pressure specified in the controlled variable information so that the oil pressure of the wheel cylinders of four wheels becomes the preparatory setting pressure. Thereby, operating oil (hydraulic oil) flows into the control hydraulic circuit of the brake actuator 45 and the pressure in the control hydraulic circuit rises, and it comes to a state where the brake pad and the brake disc 40a contacted with each other. Therefore, friction braking force for collision avoidance preparatory, which is controlled by the brake actuator 45, is given to the wheels W. In addition, in the first preparatory braking mode shown by the graph in the bottom row of FIG. 2, the vertical axis shows the deceleration produced by controlling the brake oil pressure of the wheel cylinders to be the preparatory setting pressure (collision avoidance preparatory deceleration).

In addition, when the brake pedal operation by a driver is detected in the first preparatory braking mode, the brake ECU 60 calculates, as final target oil pressure, a value which is obtained by adding the driver-demanded oil pressure obtained by converting the driver-demanded deceleration Gd* into brake oil pressure to the preparatory setting pressure, and controls the brake actuator 45 so that the oil pressure of the wheel cylinders of four wheels becomes this final target oil pressure. Alternatively, the brake ECU 60 may calculate, as final target deceleration, a value which is obtained by adding the driver-demanded deceleration Gd* to a value obtained by converting the preparatory setting pressure into deceleration, and may control the brake actuator 45 so that a self-vehicle decelerates with this final target deceleration.

When the mode information represents that the control mode is the second preparatory braking mode, the brake ECU 60 controls the brake actuator 45 based on the demanded second preparatory deceleration G2* specified in the controlled variable information so that a self-vehicle decelerates with the demanded second preparatory deceleration G2* (that is, friction braking force is controlled). Moreover, the brake ECU 60 turns on an electric relay for driving a brake lamp, and turns on the brake lamp 65. In this case, the brake ECU 60 turns on the electric relay for driving the brake lamp, and turns on the brake lamp 65 when the deceleration of the self-vehicle reaches a predetermined deceleration at which lighting of a brake lamp is permitted (for instance, the demanded second preparatory deceleration G2*). Therefore, the brake lamp 65 can properly turn on the brake lamp in a preparatory stage and can call attention of a driver of a following vehicle.

In addition, in the second preparatory braking mode, when a brake pedal operation by a driver is detected, the Brake ECU 60 calculates, as final target deceleration, a value which is obtained by adding the driver-demanded deceleration Gd* according to the brake operation amount BP to the demanded second preparatory deceleration G2*, and controls the brake actuator 45 so that the self-vehicle decelerates with this final target deceleration.

When the mode information represents that the control mode is the collision avoidance braking mode, the brake ECU 60 controls the brake actuator 45 so that a self-vehicle decelerates with the demanded collision avoidance deceleration GPB* (that is, friction braking force is controlled), based on the demanded collision avoidance deceleration GPB* specified in the controlled variable information.

The brake ECU 60 increases the brake oil pressure gradually at a predetermined increase rate, when the brake oil pressure supplied to the wheel cylinders is increased in the first preparatory braking mode and the second preparatory braking mode. For instance, in the second preparatory braking mode, the brake ECU 60 sets the target deceleration of the self-vehicle to the demanded second preparatory deceleration G2*, and controls the brake oil pressure so that an actual deceleration is equal to the demanded second preparatory deceleration G2*. In this case, the brake ECU 60 increases the brake oil pressure so that a climb gradient (increase rate) of (an absolute value of) the deceleration (time derivative value of deceleration) until the deceleration of the self-vehicle reaches the demanded second preparatory deceleration G2* becomes a predetermined loose gradient. This is for not giving sense of discomfort to a driver by deceleration alteration when the first preparatory braking mode and the second preparatory braking mode are carried out.

On the other hand, although the brake ECU 60 sets the target deceleration of the self-vehicle to the demanded collision avoidance deceleration GPB* and controls the brake oil pressure so that an actual deceleration is equal to the demanded collision avoidance deceleration GPB* in the collision avoidance braking mode, the brake ECU 60 increases the brake oil pressure at a higher rate in this case, as compared that in the first preparatory braking mode and the second preparatory braking mode. Therefore, the climb gradient (increase rate) of deceleration until the deceleration of the self-vehicle reaches the demanded collision avoidance deceleration GPB* becomes larger than the climb gradient of deceleration in case where the first preparatory braking mode and the second preparatory braking mode are carried out. For this reason, the actual deceleration of the self-vehicle quickly follows the demanded collision avoidance deceleration GPB* which is calculated sequentially. In addition, although the demanded collision avoidance deceleration GPB* is increasing with a predetermined gradient in the collision avoidance braking mode as shown by the graph in the bottom row of FIG. 2, this is just a transition of the calculated demanded collision avoidance deceleration GPB*, and does not represent speed at which the brake oil pressure is increased.

The above-mentioned increase rate of the brake oil pressure corresponds to the increase rate of the friction braking force generated by the brake oil pressure. Therefore, it can also be expressed that the increase rate of friction braking force when the control of friction braking force is started by the first preparatory braking mode and the second preparatory braking mode is smaller than the increase rate of friction braking force when the control of friction braking force is started by the collision avoidance braking mode. In addition, in the first preparatory braking mode, since the preparatory setting pressure is set to a low value, it is not necessary to necessarily incorporate control for positively reducing the increase rate of brake oil pressure.

When controlling the deceleration of a vehicle in the second preparatory braking mode or the collision avoidance braking mode, the target oil pressure set up according to target deceleration by a feedforward control may be calculated and the wheel cylinder pressure may be made to follow this target oil pressure. However, further accurate deceleration can be acquired by combining it with a feedback control using a deviation between a vehicle to-and-fro acceleration (actual deceleration), which is detected by the motion state sensor 64, and demanded deceleration.

When the mode information represents that the control mode is the braking hold mode, the brake ECU 60 controls the brake actuator 45 and supplies target oil pressure corresponding to the demanded braking hold deceleration GBH* to the wheel cylinders of four wheels. Thereby, even when a driver has not stepped on a brake pedal, a self-vehicle can be prevented from carrying out a creep running.

In addition, when a brake pedal operation by a driver is detected in the collision avoidance braking mode or the braking hold mode, the brake ECU 60 chooses deceleration whose absolute value is larger between the driver-demanded deceleration Gd* according to the brake operation amount BP and the demanded deceleration Gp* (demanded braking hold deceleration GBH* or demanded collision avoidance deceleration GPB*), sets the selected deceleration as final target deceleration, and controls the brake actuator 45 based on this final target deceleration.

Figure 5:
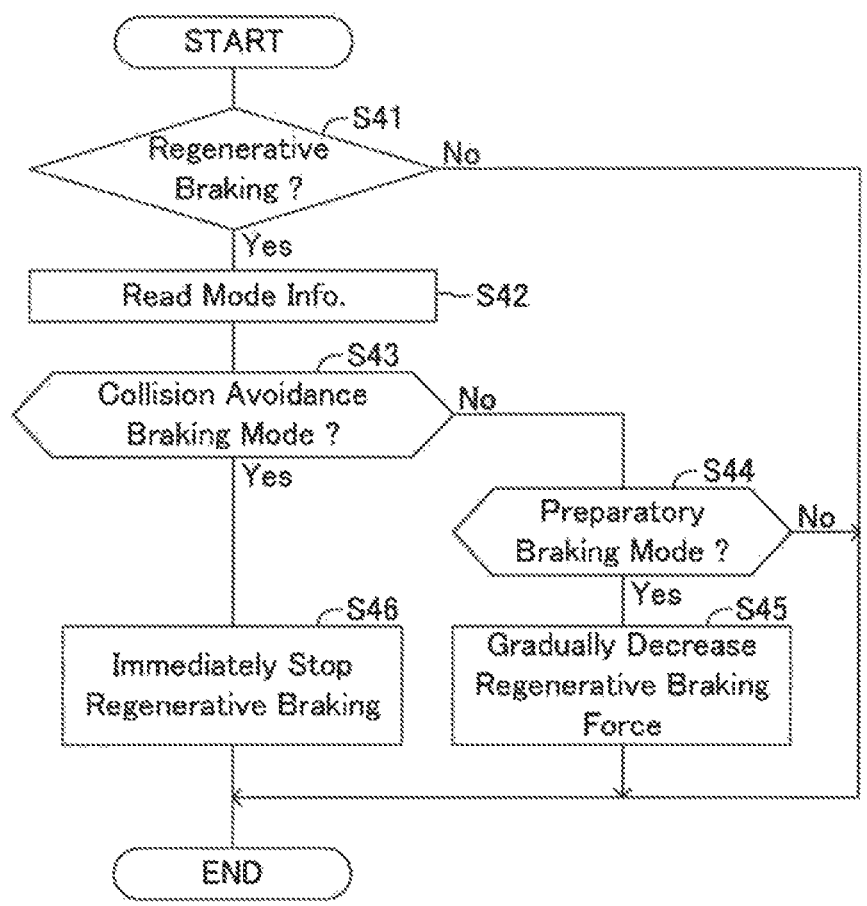
FIG. 5 is a flowchart for showing a regenerative braking end control routine.

Next, processing by the hybrid ECU 50 will be explained. FIG. 5 shows a regenerative braking end control routine which the hybrid ECU 50 carries out. In a period during which an ignition switch is turned on, the regenerative braking end control routine is carried out repeatedly in a short predetermined calculation period.

Once the regenerative braking end control routine starts, the hybrid ECU 50 judges where it is a situation where regenerative braking force is being generated in step S41. The situation where regenerative braking force is being generated means a situation where regenerative braking force is being generated by the regeneration coordination brake control according to the brake operation amount BP (>0), or a situation where regenerative braking force corresponding to engine braking at the pedal-off time is being generated, for example. In a situation where regenerative braking force is not generated, the hybrid ECU 50 once ends the regenerative braking end control routine as it is. In a situation where regenerative braking force is being generated, the hybrid ECU 50 reads the newest mode information transmitted to the CAN 80, in step S42.

Then, the hybrid ECU 50 judges whether the control mode is the collision avoidance braking mode in step S43. When the control mode is not the collision avoidance braking mode, the hybrid ECU 50 judges, in step S44, whether the control mode is the first preparatory braking mode or the second preparatory braking mode. When the control mode is neither the first preparatory braking mode nor the second preparatory braking mode, the hybrid ECU 50 once ends the regenerative braking end control routine.

The hybrid ECU 50 repeats such processing, and when it is judged that the control mode is the first preparatory braking mode or the second preparatory braking mode in step S44, the hybrid ECU 50 gradually decreases regenerative braking force in step S45. Namely, the hybrid ECU 50 gradually decreases regenerative braking force to zero at a predetermined decrease rate. This predetermined decrease rate is a rate later than a rate at which regenerative braking force can be made to disappear most quickly.

On the other hand, when it is judged that the control braking mode is the collision avoidance braking mode (S43: Yes), the hybrid ECU 50 immediately stop regenerative braking in step S46, i.e., regenerative braking force is made to disappear immediately.

Therefore in accordance with the regenerative braking end control routine, when the first preparatory braking mode or the second preparatory braking mode is started during regenerative braking, regenerative braking force is gradually decreased from its initiation time. Moreover, when the first preparatory braking mode and the second preparatory braking mode are skipped and the collision avoidance braking mode is started, as in a case where an obstruction suddenly jumps in front of a self-vehicle from the side, regenerative braking force is made to disappear instantly.

Here, the reason why the rate at which regenerative braking force is decreased is switched in this way depending on the control mode will be explained. Hereafter, the first preparatory braking mode and the second preparatory braking mode may be collectively and simply referred to as a preparatory mode.

When an automatic brake is started, the hybrid ECU 50 is forbidden from generating regenerative braking force, and it is switched to a braking force control only by friction braking force. When regenerative braking is forbidden in a situation where regenerative braking force is being generated, the regenerative braking force being generated till then disappears suddenly, and friction braking force controlled by of control variable, which that collision avoidance assist ECU 70 instructs, is generated in place thereof.

For instance, the hybrid ECU 50 generates braking force equivalent to engine braking by regenerative braking force at the pedal-off time. Since a certain magnitude of regenerative braking force is required at the pedal-off time, it is larger than friction braking force in the preparatory brake in most cases (the deceleration of a vehicle at the pedal-off time is larger than the deceleration in the preparatory braking mode). For this reason, when the preparatory braking mode is started during regenerative braking at the pedal-off time, there is a possibility that the deceleration of the vehicle may fall suddenly and a sense of discomfort may be given to a driver.

Especially, in the present embodiment, since the brake ECU 60 gradually increases the brake oil pressure so that a sense of discomfort is not given to a driver on giving braking force when the preparatory braking mode is started, deceleration immediately after starting the preparatory braking mode is considerably small. Therefore, when regenerative braking force has been generated since before the preparatory braking mode is started, the deceleration of the vehicle falls suddenly.

Figure 6:
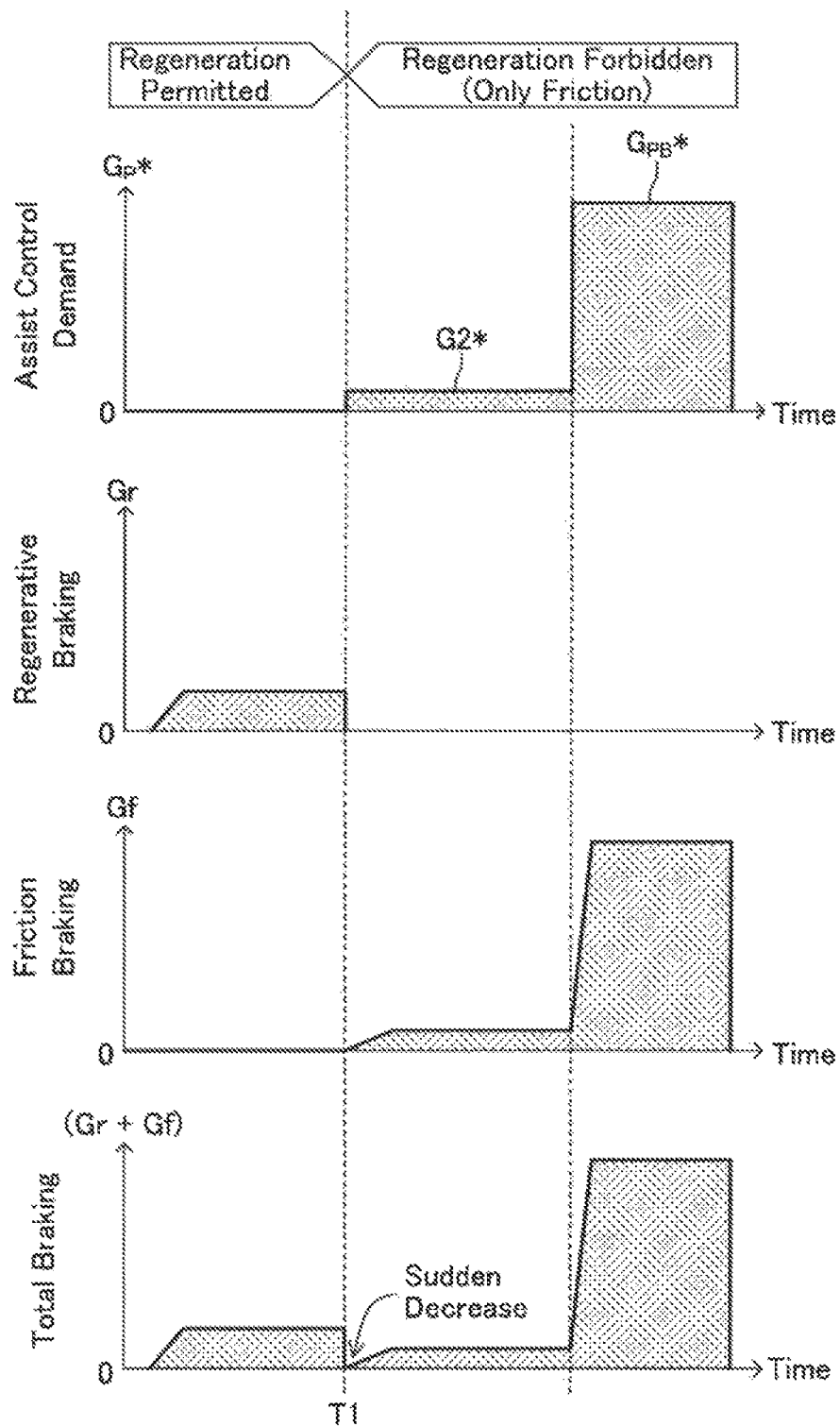
FIG. 6 is a group of graphs for showing alterations of decelerations when regenerative braking force is not gradually decreased when a second preparatory braking mode is started (comparative example).

As an example, FIG. 6 shows alterations of decelerations when regenerative braking force is not gradually decreased when the second preparatory braking mode is started. Before the time T1, the vehicle is decelerating (slowing down) with a predetermined deceleration Gr according to regenerative braking force. Then, when the second preparatory braking mode is started at the time T1, regenerative braking force disappears instantly, and friction braking force is generated instead thereof. In this case, although the demanded deceleration Gp* is set to the demanded second preparatory deceleration G2*, the demanded second preparatory deceleration G2* is smaller as compared with the deceleration Gr by the regenerative braking force at the pedal-off time. In addition, since the brake ECU 60 increases the brake oil pressure increase with a predetermined gradient (increase rate), not instantly, the deceleration Gf by friction braking force also increases toward the demanded second preparatory deceleration G2* with a climb gradient corresponding thereto. As a result, the deceleration of the vehicle (Gr+Gf) once falls close to zero, and increases from there to converge on the demanded second preparatory deceleration G2*.

For this reason, there is a possibility that the deceleration of the vehicle may fall suddenly and a sense of discomfort may be given to a driver at the time T1. Such an issue may occur also in a case where the first preparatory braking mode is started from a state that regenerative braking force is being generated. In the first preparatory braking mode, although the brake actuator 45 is controlled so that the brake oil pressure of the wheel cylinders becomes the preparatory setting pressure, the deceleration by friction braking force is smaller as compared with the deceleration by regenerative braking force since the preparatory setting pressure is small. In addition, since the brake oil pressure is increased gradually, the deceleration of the vehicle falls suddenly and a sense of discomfort is given to a driver.

Figure 7:
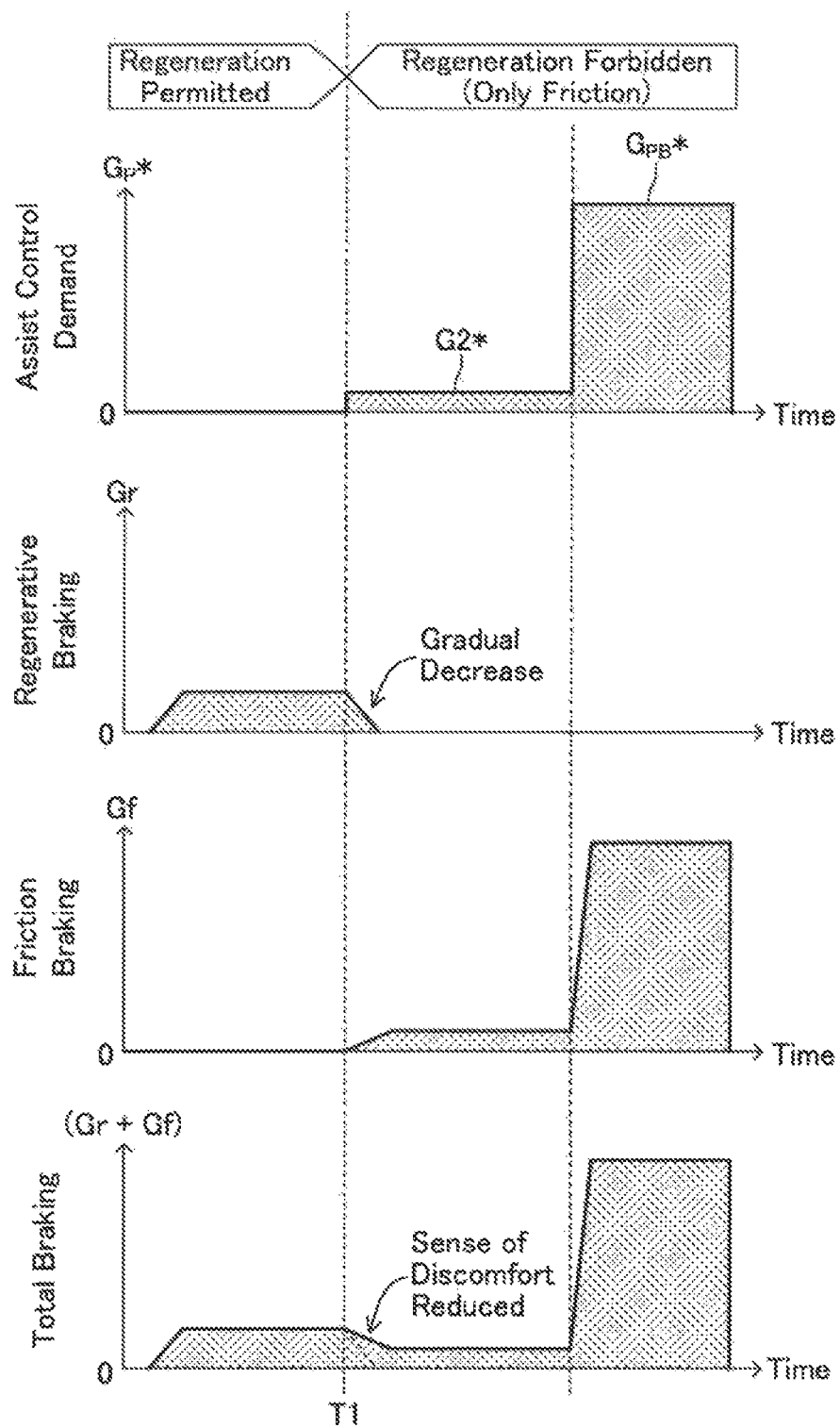
FIG. 7 is a group of graphs for showing alterations of decelerations in a case where regenerative braking force is gradually decreased when a second preparatory braking mode is started.

Then, in the present embodiment, when the first preparatory braking mode or the second preparatory braking mode is started, the hybrid ECU 50 gradually reduces regenerative braking force from its initiation time (step S45). FIG. 7 shows alterations of decelerations when the second preparatory braking mode is started from the state that regenerative braking force is being generated at the pedal-off time, in the present embodiment. When the second preparatory braking mode is started at the time T1, the deceleration Gr generated by regenerative braking force falls, according to the decrease rate of regenerative braking force Simultaneously, according to the increase in the brake oil pressure by the second preparatory braking mode, the deceleration Gf generated by friction braking force increases. Therefore, the deceleration of the self-vehicle (Gr+Gf) does not fall greatly. As a result, a sense of discomfort given to a driver can be reduced as much as possible.

Figure 8:
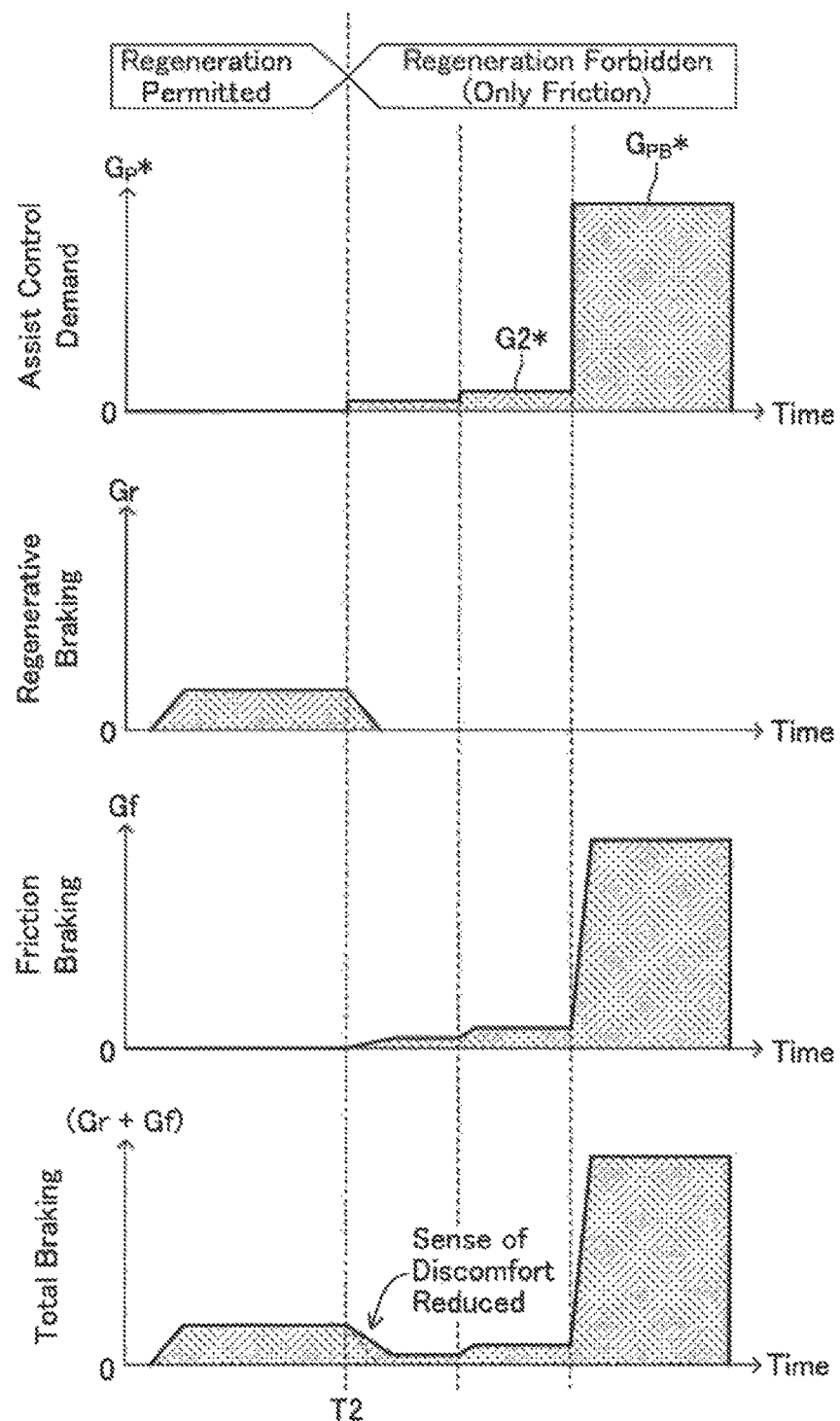
FIG. 8 is a group of graphs for showing alterations of decelerations in a case where regenerative braking force is gradually decreased when a first preparatory braking mode is started.

FIG. 8 shows alterations of decelerations when the first preparatory braking mode is started from a state that regenerative braking force is being generated at the pedal-off time, in the present embodiment. Also in this example, since regenerative braking force decreases gradually from the time T2 when the first preparatory braking mode is started, the deceleration of the vehicle (Gr+Gf) does not fall greatly at the time T2. As a result, a sense of discomfort given to a driver can be reduced as much as possible.

On the other hand, in a case where regenerative braking force is gradually decreased similarly to the preparatory braking mode when the collision avoidance braking mode is started from a state that regenerative braking force is being generated, there is a possibility that the deceleration of the self-vehicle may deviate from a proper value this time. In the collision avoidance braking mode, the demanded collision avoidance deceleration GPB* is set so that the self-vehicle does not collide with an obstruction, and so that a following vehicle does not rear-end the self-vehicle (does not clash against the self-vehicle from behind). Accordingly, there is a demand for making the deceleration of the self-vehicle follow the demanded collision avoidance deceleration GPB* quickly. Therefore, in the collision avoidance braking mode, the brake oil pressure is controlled to increases at a higher rate as compared with that in the preparatory braking mode. When regenerative braking force remains in a situation where friction braking force is thus controlled, there is a possibility that braking force given to the wheels W may become excessive and it may become impossible to control the deceleration properly. In that case, a risk that a following vehicle rear-ends the self-vehicle (clashes against the self-vehicle from behind).

Figure 9:
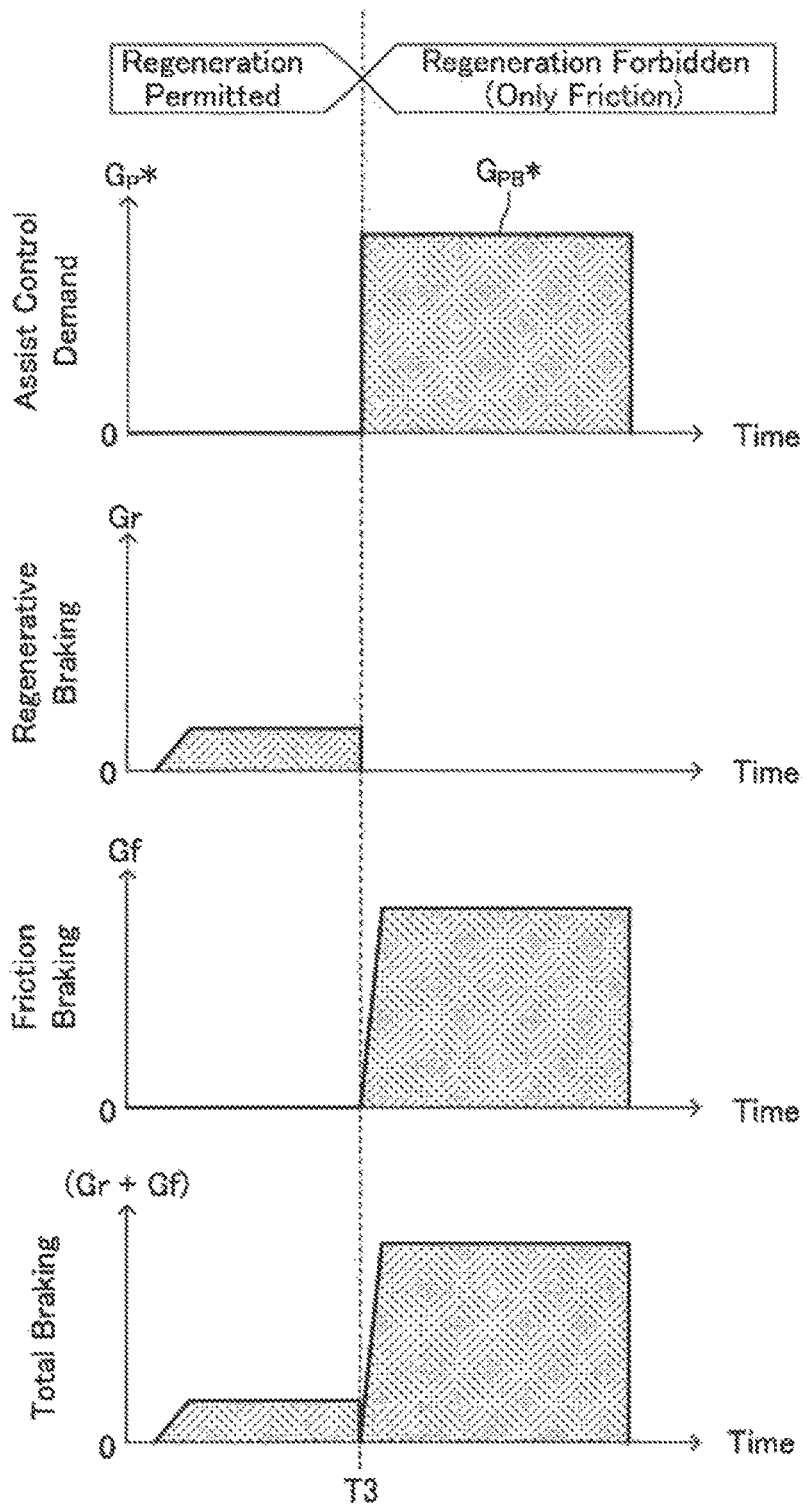
FIG. 9 is a group of graphs for showing alterations of decelerations in a case where regenerative braking force is not gradually decreased when a collision avoidance braking mode is started.

Then, in the present embodiment, when the collision avoidance braking mode is started from a state that regenerative braking force is being generated, the hybrid ECU 50 makes regenerative braking force disappear instantly from its initiation time (step S46). FIG. 9 shows alterations of decelerations when the collision avoidance braking mode is started from a state that regenerative braking force is being generated at the pedal-off time, in the present embodiment. When the collision avoidance braking mode is started at the time T3, the deceleration Gr generated by regenerative braking force falls to zero quickly, and the deceleration Gf generated by friction braking force increases quickly instead. Accordingly, since regenerative braking force does not remain after the collision avoidance braking mode is started, the braking force given to the wheels W does not become excessive, and the deceleration of the self-vehicle can be controlled properly. Therefore, collision avoidance performance can be improved, not only for a collision with an obstruction in front, but also for a rear-end collision by a following vehicle.

Although the above-mentioned example is an example in which the preparatory braking mode or the collision avoidance braking mode is started from a state that regenerative braking force is being generated at the pedal-off time, the same is true in a case where the preparatory braking mode or the collision avoidance braking mode is started from a state that a driver is stepping on a brake pedal. In this case, in the collision avoidance braking mode, a value of the larger one between the driver-demanded deceleration, which is determined according to a brake operation amount, and the demanded collision avoidance deceleration GPB* is set as the target deceleration. Moreover, in the preparatory braking mode, a sum total value of the driver-demanded deceleration and the demanded preparatory deceleration set in the preparatory braking mode is set as the target deceleration.

Figure 10:
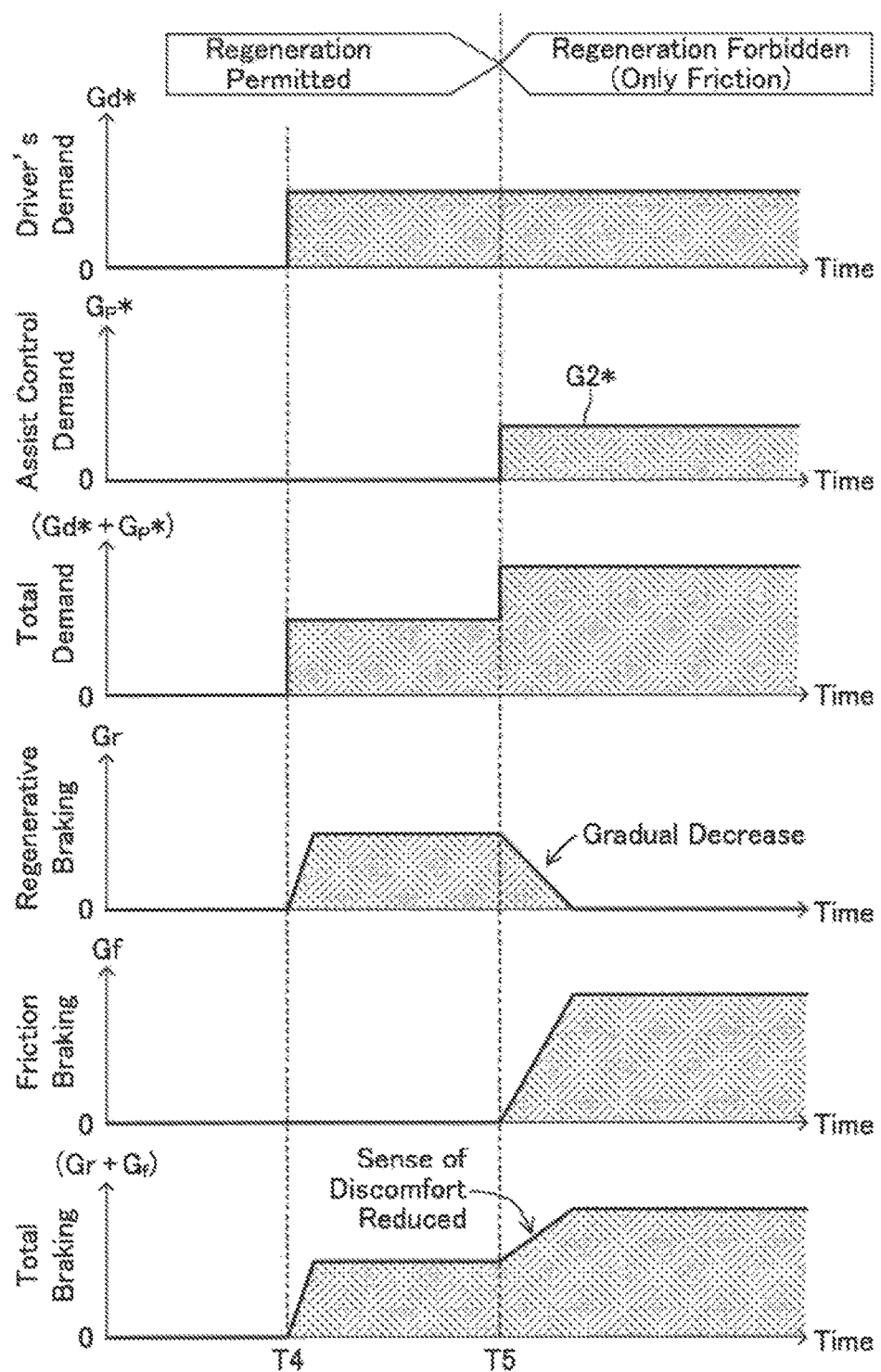
FIG. 10 is a group of graphs for showing alterations of decelerations in a case where regenerative braking force is gradually decreased when a second preparatory braking mode is started in a state where a brake pedal operation is performed.

For instance, as shown in FIG. 10, a brake pedal operation is performed at the time T4, and the driver-demanded deceleration Gd* is set. When the driver-demanded deceleration Gd* can be attained only by regenerative braking force, all of the driver-demanded deceleration Gd* is distributed to regenerative braking force, and the vehicle decelerates (slows down) with the deceleration Gr by the regenerative braking force. When the second preparatory braking mode is started at the time T5 from this state, the final target deceleration is set to a sum total value (Gd*+G2*) of the driver-demanded deceleration Gd* and the demanded second preparatory deceleration G2*. In this case, at the time T5, brake oil pressure is supplied to the wheel cylinders at a predetermined increase rate and friction braking force occurs, at the same time as regenerative braking force is gradually decreased. In this way, the deceleration Gr generated by regenerative braking force falls at a predetermined rate, and the deceleration Gf generated by friction braking force increases at a predetermined rate, from the time T5. As a result, an alteration of the deceleration (Gr+Gf) of the self-vehicle at the time T5 can be suppressed, and a sense of discomfort given to a driver can be reduced as much as possible.

As mentioned above, although control units for a vehicle, according to the present embodiments had been explained, the present disclosure is not limited to the above-mentioned embodiments, and various modifications are possible for the present disclosure unless they deviate from the objective of the present disclosure.

For instance, although application to a hybrid vehicle has been explained in the present embodiments, it can also be applied to an electric vehicle which does not comprise an engine as a drive source for running.

Moreover, although the preparatory braking mode is divided into the first preparatory braking mode and the second preparatory braking mode in which brake oil pressure is controlled respectively for different purposes in the present embodiment, it is not necessary to necessarily carry out these two preparatory braking modes, and only either may be carried out. Furthermore, another preparatory braking mode may be added.

Moreover, although the hybrid ECU 50 stops regenerative braking immediately in step S46 in the present embodiment, regenerative braking force may be gradually, but comparatively suddenly decreased, at a decrease rate within a range where the whole braking force does not become excessive. In this case, what is necessary is just to decrease regenerative braking force at a decrease rate which is larger than the decrease rate of regenerative braking force in step S45.

REFERENCE SIGNS LIST

10: Engine, 11: First Motor Generator, 12: Second Motor Generator, 13: Inverter, 14: Battery, 40: Friction Brake Mechanism, 45: Brake actuator, 61: Brake Sensor, 62: Brake Switch, 65: Brake Lamp, 71: Radar Sensor, 50: Hybrid ECU, 60: Brake ECU, 70: Collision Avoidance Assist ECU.

The invention claimed is:

1. A control unit for a vehicle comprising a regenerative braking device that generates electric power by a wheel rotated by external force, collects the generated electric power in an on-vehicle battery, and gives regenerative braking force to said wheel, and a friction braking device that gives friction braking force to said wheel by brake oil pressure, the control unit comprising:
   an indicator acquisition means to acquire an indicator which represents a height of a possibility that said vehicle collides with an obstruction; and
   a collision avoidance assist control means to assist a driver so that the possibility of a collision of said vehicle with said obstruction is reduced by giving friction braking force by said friction braking device to said wheel while reducing regenerative braking force by said regenerative braking device towards zero while decelerating said vehicle, based on said indicator, wherein said collision avoidance assist control means comprises:
   a first deceleration control means to start its operation and to decelerate said vehicle with a collision avoidance preparatory deceleration by said friction braking force, when said indicator exceeds an avoidance preparatory threshold value,
   a second deceleration control means to start its operation and to decelerate said vehicle with a collision avoidance deceleration, which is larger than said collision avoidance preparatory deceleration, by said friction braking force, when said indicator exceeds a collision avoidance threshold value, which is larger than said avoidance preparatory threshold value, and
   a regeneration end control means to start gradually decreasing or continue gradually decreasing the regenerative braking force, which said regenerative braking device is generating, towards zero when said first deceleration control means starts its operation in a situation where said regenerative braking device is generating regenerative braking force such that the regenerative braking force is the only braking force decelerating said vehicle prior to when the first deceleration control means starts its operation, and a value of a total braking force of the regenerative braking force and the friction braking force for decelerating said vehicle once the first deceleration control means starts its operation is not more than a value of the regenerative braking force prior to when the first deceleration control means starts its operation until the regenerative braking force has decreased to zero, and to start decreasing the regenerative braking force at a higher rate as compared with the case where said first deceleration control means starts its operation towards zero when said second deceleration control means starts its operation in a situation where said regenerative braking device is generating regenerative braking force such that the regenerative braking force is the only braking force decelerating said vehicle prior to when the collision avoidance deceleration starts and the friction braking force is the only braking force decelerating said vehicle after the second deceleration control means starts its operation and thereafter the regenerative braking force has been decreased to zero.

2. The control unit according to claim 1, wherein; said first deceleration control means is further configured to:
   control said friction braking force so that said vehicle decelerates with a target collision avoidance preparatory deceleration which is a target value of said collision avoidance preparatory deceleration, and
   turn on a brake lamp.

3. The control unit according to claim 2, wherein said second deceleration control means is configured to:
   calculate a target collision avoidance deceleration which is a target value of said collision avoidance deceleration based on a distance from said vehicle to an obstruction and a relative velocity of said vehicle with respect to said obstruction,
   control said friction braking force so that said vehicle decelerates with said calculated target collision avoidance deceleration, and
   set an increase rate of said friction braking force at a time of an operation start of said first deceleration control means to be smaller than an increase rate of said friction braking force at a time of an operation start of said second deceleration control means.

4. A control unit for a vehicle comprising a regenerative braking device that generates electric power by a wheel rotated by external force, collects the generated electric power in an on-vehicle battery, and gives regenerative braking force to said wheel, and a friction braking device that gives friction braking force to said wheel by brake oil pressure, the control unit comprising circuitry configured to:

acquire an indicator which represents a height of a possibility that said vehicle collides with an obstruction;

assist a driver so that the possibility of a collision of said vehicle with said obstruction is reduced by giving friction braking force by said friction braking device to said wheel while reducing regenerative braking force by said regenerative braking device towards zero while decelerating said vehicle, based on said indicator;

decelerate said vehicle with a collision avoidance preparatory deceleration by said friction braking force, when said indicator exceeds an avoidance preparatory threshold value;

decelerate said vehicle with a collision avoidance deceleration, which is larger than said collision avoidance preparatory deceleration, by said friction braking force, when said indicator exceeds a collision avoidance threshold value, which is larger than said avoidance preparatory threshold value; and start gradually decreasing or continue gradually decreasing the regenerative braking force, which said regenerative braking device is generating, towards zero when starting the decelerating said vehicle with the collision avoidance preparatory deceleration in a situation where said regenerative braking device is generating regenerative braking force such that the regenerative braking force is the only braking force decelerating said vehicle prior to starting the collision avoidance preparatory deceleration, and a value of a total braking force of the regenerative braking force and the friction braking force for decelerating said sclf vehicle once the collision avoidance preparatory deceleration starts is not more than a value of the regenerative braking force prior to when the collision avoidance preparatory deceleration starts until the regenerative braking force has decreased to zero, and to start decreasing the regenerative braking force at a higher rate as compared with the decrease in the regenerative braking force when starting the decelerating said vehicle with the collision avoidance preparatory deceleration, towards zero when decelerating said vehicle with the collision avoidance deceleration in a situation where said regenerative braking device is generating regenerative braking force such that the regenerative braking force is the only braking force decelerating said vehicle prior to when the collision avoidance deceleration starts and the friction braking force is the only braking force decelerating said vehicle after the collision avoidance deceleration starts and thereafter the regenerative braking force has been decreased to zero.

5. The control unit according to claim 4, wherein the circuitry is further configured to:

control said friction braking force so that said vehicle decelerates with a target collision avoidance preparatory deceleration which is a target value of said collision avoidance preparatory deceleration, and turn on a brake lamp.

6. The control unit according to claim 5, wherein; the circuitry is further configured to:

calculate a target collision avoidance deceleration which is a target value of said collision avoidance deceleration based on a distance from said vehicle to an obstruction and a relative velocity of said vehicle with respect to said obstruction, control said friction braking force so that said vehicle decelerates with said calculated target collision avoidance deceleration, and set an increase rate of said friction braking force at a time of an operation start of said decelerating said vehicle with the collision avoidance preparatory deceleration to be smaller than an increase rate of said friction braking force at a time of an operation start of said decelerating said vehicle with the collision avoidance deceleration.

* * * * *